No. 745,753. PATENTED DEC. 1, 1903.
H. L. ADAMS.
FILE SCRAPER.
APPLICATION FILED MAY 7, 1903.
NO MODEL.
FIG_1_
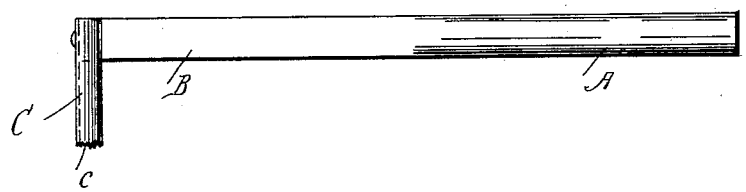
FIG_2_
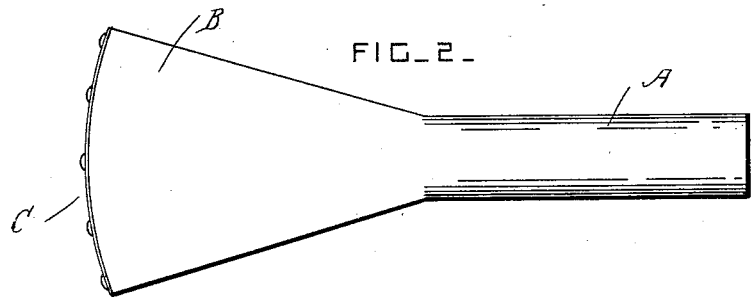
FIG_3_
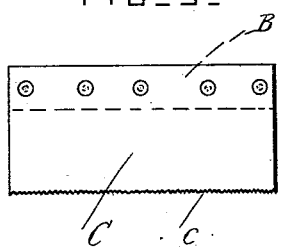
WITNESSES
Walter Allen
James M. Spear
INVENTOR
Harry L. Adams.
by Herbert H. J. Jenner.
Attorney No. 745,753. Patented December 1, 1903.

UNITED STATES PATENT OFFICE.

HARRY L. ADAMS, OF DEXTER, MISSOURI.

FILE-SCRAPER.

SPECIFICATION forming part of Letters Patent No. 745,753, dated December 1, 1903.

Application filed May 7, 1903. Serial No. 156,075. (No model.)

*To all whom it may concern:*

Be it known that I, HARRY L. ADAMS, a citizen of the United States, residing at Dexter, in the county of Stoddard and State of Missouri, have invented certain new and useful Improvements in File-Scrapers; and I do hereby declare the following to be a full, clear, and exact description of the invention, such as will enable others skilled in the art to which it appertains to make and use the same.

This invention relates to scrapers for cleaning files; and it consists in the novel construction and combination of the parts hereinafter fully described and claimed.

In the drawings, Figure 1 is a side view of the scraper. Fig. 2 is a plan view of the same. Fig. 3 is an end view of the scraper.

A is a handle of any approved form, which carries a curved plate B.

C is a curved scraping-blade formed of thin and soft sheet-iron coated with tin upon each side. This blade is secured to the curved plate B, and its curvature gives it the necessary stiffness. The blade C has a finely-serrated scraping edge $c$, the serrations being adapted to engage with the small grooves of the file and to remove from them all matter which is blocking them and preventing the file from cutting freely. The thin coating of tin upon the soft iron of the blade assists very materially in cleaning the file.

What I claim is—

1. In a file-scraper, the combination, with a handle carrying a curved plate, of a curved blade of thin and soft sheet metal secured to the said plate and provided with a finely-serrated scraping edge.

2. In a file-scraper, the combination, with a handle carrying a curved plate, of a curved blade of thin and soft sheet-iron coated with tin, said blade being secured to the said plate and provided with a finely-serrated scraping edge.

In testimony whereof I affix my signature in presence of two witnesses.

HARRY L. ADAMS.

Witnesses:
S. B. TATUM,
M. L. GARNER.